Patented Apr. 3, 1951

2,547,281

UNITED STATES PATENT OFFICE 2,547,281

METHOD OF REFINING MILK AND MILK PRODUCTS

Uel N. Petty, Cushing, Okla.

No Drawing. Application September 14, 1949, Serial No. 115,784

7 Claims. (Cl. 99—119)

This invention relates to a method of refining milk and has particular relation to a method of refining milk to obtain a complete recovery of pure milk fat and recovery of milk solids in a refined semi-solid condition.

It has heretofore been proposed to obtain oil or fat from cream by freezing the milk to break the emulsion, one theory being that the freezing converts the water from a fluid to a crystalline state and leaves the fat in gathered and concentrated masses by itself, the treated cream then being washed with warm water to wash from the fat any minute particles of non-fat solids that may remain, final separation being accomplished by centrifuging.

It has also been proposed to treat neutralized sour cream by injecting live steam into the cream to facilitate the removal of impurities.

It has also been proposed to obtain a nonkeeping butter oil from milk by bubbling live steam into a watered milk in order to dissolve the casein, separation being accomplished by centrifuging.

It has also been proposed to obtain butter fat from sour milk products by directly heating a neutralized sour milk in a separator with steam to obtain an overall temperature of about 100 to 200° F. for the purpose of increasing fluidity of the product and reducing the accumulation of curds.

It has also been proposed to obtain a milk fat concentrate by subjecting pasteurized cream in the dispersed phase simultaneously to reduced pressure and to the direct action of steam and thereafter concentrating the milk fat by a centrifugal action at a temperature above the melting point of the fat.

It has also been proposed to extract oil from milk by centrifuging the milk with warm water, then cooling the milk to about 55° F. to agglomerate the fat globules under mechanical agitation to obtain a pasty mass and thereafter treating the pasty mass under agitation in a tank of warm water at about 100° F. followed by centrifugal separation.

An object of the present invention is to obtain milk fat from whole, sweet or sour milk, or any fraction thereof, by subjecting the milk to a controlled thermol shock treatment within an overall temperature range, preferably varying from 20° to 120° F.

Still another object of the invention is to provide a method for refining milk to obtain refined milk fat which method is effective, practical and economical.

Another object is to provide a method for the recovery of refined milk fat which method in batch form will require only about 30 or 40 minutes time and which may be practiced in continuous form.

Another object of the invention is to provide a method for the complete recovery of fat from milk.

Another object of the invention is to provide for the complete recovery from milk of a refined fat which has exceptional keeping qualities in that it may be stored indefinitely at normal atmospheric temperatures without resulting in rancidity, loss of color or deterioration.

Another object is to provide a method for the complete recovery from milk of a refined fat which is characterized by the absence of "offodor" normally found in milk products as a result of feed or vegetation in the diet.

Still another object of the invention is to provide a method of refining milk to obtain a complete recovery of highly refined fat and highly refined milk solids in a semi-solid condition, the latter being of high commercial value as components of dairy spreads, ice cream mix, etc.

Another object is to provide a method for the recovery of butterfat which will test at the high value of about 99.55% to 99.85% of fat with no appreciable moisture, and which may be held at room summer temperatures for several weeks without showing any loss or color intensity or other signs of deterioration.

These and other objects of the invention will be particularly understood by reference to the following description.

The invention generally consists of a method of obtaining a highly refined milk fat which comprises chilling milk to a temperature below the freezing point of water, progressively sweating said chilled milk by subjecting the exposed surface of the chilled milk to vapor phase contact with live steam at such rate as to progressively attain the melting point of the milk fat, continuously removing the melted portion from the chilled portion, and separating the resulting water and non-fat solids from the fat.

Preferably, the invention consists of a method of obtaining a highly refined milk fat which comprises preheating milk to a temperature in the range of about animal body temperature and 120° F., rapidly chilling said milk to a temperature below the freezing point of water, progressively sweating said chilled milk by subjecting the exposed surface of the chilled milk to vapor phase contact with live steam at such rate as to progressively attain the melting point of the milk fat, continuously removing the melted portion from the chilled portion, and separating the resulting water and non-fat solids from the fat.

In one of the preferred embodiments of the present method, a charge of milk is preheated to about 115 to 120° F. to reduce oxidation and produce a swelling or expansion beyond the natural condition of the milk components as they exist at animal body temperature. This preliminary step is desirable in that the initial light thermol increase appears to weaken the natural emulsion. The equipment utilized for this step may be any conventional apparatus used for pasteurization or for preheating milk or milk products.

The preheated milk charge is next subjected to chilling to a temperature below the freezing point of water and preferably to a temperature range in the neighborhood of 20 to 30° F. It is believed that due to the crystallization point and difference of contraction and expansion coefficients of the components of milk, that an intense rapid and excessive thermal shock results. It is further believed that this thermol shock result is a rupture or breaking of the film or envelope of serum and casein which is believed to surround each fat globule, thereby freeing the fat of its natural bond. Actually, it is believed that by crystallization the wax or waxy portion of the casein and serum are refined and set apart from the non-fat milk solids. It is apparently not authoritatively settled as to whether the fat globules in milk are solidified by a membrane or by a gelatinized mucoid, semi-liquid substance. It has been advanced that the membrane consists of insoluble casein or milk-fibrin. It has also been advanced that the stability of fat globule in milk is due entirely to a protective layer of casein. It is not desired that the invention be restricted by any particular theory and whatever the nature of the natural bond, it is sufficient for purposes of the preesnt invention that the method discovered actually frees the fat of its natural bonds and also serves to separate the non-fat milk solids. The equipment used in the chilling step may comprise a conventional ice cream freezer either continuous or batch type, or a revolving drum-type freezer equipment with the usual scraper attachment to remove the crystallized material from the cold surface.

The milk charge is next subjected to a controlled sweating process, preferably within a closed vessel; that is, one which excludes atmosphere.

Preferably, within this vessel is located a receiving compartment so as to permit free discharge of the milk charge contained therein as rapidly as the preferred discharge temperature is reached. The controlled sweating is attained by means of live steam which is introduced into the vessel containing the chilled milk charge so as to produce a thermol shock and sweating. The amount and pressure of the steam are regulated so as to achieve and maintain a discharge temperature of the milk charge below about 120° F. and preferably in the range of about 50 to 80° F. While it is not intended to limit the invention to any particular theory, it is believed that by the instant exposure of the apparently crystallized milk components to steam, refining of the fat and waxy portion of the casein takes place thereby permitting the satisfaction of the natural affinity of wax and fat to a maximum. In this connection it has been found that a live steam pressure of about 5 pounds is satisfactory.

Although the sweating temperature on the actual surface of the milk under the thermol shock treatment is not known inasmuch as the temperature exchange is practically instantaneous, it is believed that this step results in some control over the solidity or melting point of the refined fat. It is desired to point out that the only water introduced by virtue of the present method is that contributed by the steam condensate.

The equipment utilized for the sweating step may be a closed milk storage tank, or a closed cheese vat having an interior basket or perforated trough to act as the receiving vessel for the crystallized charge, the receiving vessel being so placed as to obtain maximum exposure to the steam thereby permitting an unrestricted flow away of the fat components as they are sweated out.

The final step in the present process consists of separation of the water and fat from the non-fat solids. The charge resulting from the preceding sweating step is brought to about 80 to 120° F. and preferably to about 100° F. to aid in the separation which may be conveniently carried out in a conventional centrifuge for separating whey and milk solids or sludging of solids. The combined fat and water are passed to a second centrifuge of the conventional type for the separation of fat or oil from water. The resulting fat from the second stage centrifuge may be clarified by further centrifuge or by passing through a filter media, for example, if less than .05% moisture is desired.

It has been found that by the present method the milk fat loss is practically nil and that practically all non-fat solids are recovered. Control of the characteristics of the finished product may be obtained by control of the thermol shock conditions. It is desired to point out that the present process of thermol shock treatment comprising a chilling followed by an instantaneous sweating achieved by means of vapor phase contact with live steam is carried on at an overall temperature range varying from about 20 to 120° F.

Accordingly, the essence of the present invention lies in the discovery that the sequential steps comprising the chilling of the milk to a temperature below the freezing point of water and preferably between 20 to 30° F., followed by an instantaneous thawing of the crystallized charge attained by sweating the exposed surface of the charge in vapor phase contact with live steam to progressively attain the melting point of the fat, preferably controlled by having a flow away discharge temperature of about 50 to 80° F., results in the complete refinement of milk to produce a complete recovery of highly refined milk fat and highly refined non-fat milk solids which may readily and completely be separated.

The following specific working examples are set forth to further illustrate the present process:

*Example I*

A batch of whole milk is run through a separator to draw off the skim until 100 lb. of cream having a 25 to 50% fat content is obtained. In this instance a cream having a 44% fat content as determined by the Babcock Test was utilized.

The cream was preheated to about 110 to 120° F. in a conventional pasteurizer and thereafter the preheated charge was directed into a continuous freezer where it was rapidly chilled to a temperature of about 20 to 30° F.

The chilled and crystallized charge was then immediately passed into a closed vessel comprising a sweating chamber. The closed vessel was provided with a mesh screen basket to receive the crystallized charge and was also provided with a low pressure steam inlet and a drain outlet. A steam pressure of about 5 lb. was utilized. It should be pointed out that the crystallized mass which is suspended in the mesh screen basket is surrounded by steam vapor which contacts the exposed surface of the charge. This step results in a progressive sweat inasmuch as the various components of the crystallized mass have widely different melting points ranging up to 170° F. Thus, the result of the sweating step is not to heat or break the emulsions but to reach the melting point of the milk while staying below the melting point of the waxy portion of the casein. As the melting point of each exposed fat particle on the surface of the crystallized mass is reached, it sweats away from the chilled mass and at the same time the steam condensate acts as a diluent to the water soluble components and as a vehicle for the crystalline, non-melting solids thereby accelerating the flow-away. By virtue of this step, the separation of the water and non-fat solids is completed before the wax and casein components are melted or liquefied.

The flow-away discharge from the sweating chamber should be withdrawn as fast as possible in order to avoid heating. Additionally, it has been found desirable to utilize the lowest possible sweating temperature which may be regulated by maintaining the flow-away discharge temperature to about 50 to 80° F. It has also been found desirable to adjust the flow of low pressure steam and the flow of the crystallized charge so that the steam condensate will subsequently equal the cream in volume.

The flow-away discharge is then run through a centrifuge to effect a three component separation; namely, fat, sludge, and whey plus water from the steam condensate. The fat at this stage was determined at 99% plus.

The resulting fat was then heated to about 120° F. and then run through a centrifugal clarifier. The final product comprising refined butter fat also analyzed at 99.8% fat and no appreciable moisture. The finished product was heated at summer room temperatures for over three weeks and showed no sign of deterioration. The original color was deep yellow and no decrease in intensity of color was observed after the aging.

The final refined fat product weighed 44 lb. thereby evidencing a complete recovery.

The process as set forth above was repeated with additional batches and the resulting refined fat product obtained tested respectively as follows:

*Example II*

98.55% fat, 99.93% total solids.

*Example III*

99.10% fat, 99.91% total solids.

While the present invention has been described in a preferred embodiment, it will be apparent that various modifications may be made therein by those skilled in the art and it is intended that all such modifications come within the spirit and scope of the invention as defined by the following appended claims.

The present invention has been described in connection with obtaining milk fat from whole, sweet or sour milk, therefore, it will be understood that the term "milk" includes separate cream or other fractions of milk.

I claim:

1. The method of obtaining a highly refined milk fat which comprises chilling milk to a temperature below the freezing point of water, progressively sweating said chilled milk by subjecting the exposed surface of the chilled milk to vapor phase contact with live steam at such rate as to progressively attain the melting point of the milk fat, continuously removing the melted portion from the chilled portion, and separating the resulting water and non-fat solids from the fat.

2. The method of obtaining a highly refined milk fat which comprises chilling milk to a temperature in the range of about 20 to 30° F., progressively sweating said chilled milk by subjecting the exposed surface of the chilled milk to vapor phase contact with live steam at such rate as to progressively attain the melting point of the milk fat, continuously removing the melted portion from the chilled portion, and separating the resulting water and non-fat solids from the fat.

3. The method of obtaining a highly refined milk fat which comprises chilling milk to a temperature below the freezing point of water, progressively sweating said chilled milk by subjecting the exposed surface of the chilled milk to vapor phase contact with live steam in a closed vessel at such rate as to progressively attain the melting point of the milk fat, continuously removing the melted portion from the chilled portion, and separating the resulting water and non-fat solids from the fat.

4. The method of obtaining a highly refined milk fat which comprises chilling milk to a temperature below the freezing point of water, progressively sweating said chilled milk by subjecting the exposed surface of the chilled milk to vapor phase contact with live steam at such rate as to progressively attain the melting point of the milk fat and continuously maintain the melted portion at a flow away temperature of about 50–80° F., continuously removing the melted portion from the chilled portion, and separating the resulting water and non-fat solids from the fat.

5. The method of obtaining a highly refined milk fat which comprises chilling milk to a temperature in the range of about 20 to 30° F., progressively sweating said chilled milk by subjecting the exposed surface of the chilled milk to vapor phase contact with live steam at such rate as to progressively attain the melting point of the milk fat and continuously maintain the melted portion at a flow away temperature of about 50–80° F. continuously removing the melted portion from the chilled portion and separating the resulting water and non-fat solids from the fat.

6. The method of obtaining a highly refined milk fat which comprises preheating milk to a temperature in the range of about animal body temperature and 120° F., rapidly chilling said milk to a temperature below the freezing point of water, progressively sweating said chilled milk by subjecting the exposed surface of the chilled milk to vapor phase contact with live steam at such rate as to progressively attain the melting point of the milk fat, continuously removing the melted portion from the chilled portion, and separating the resulting water and non-fat solids from the fat.

7. The method of obtaining a highly refined milk fat which comprises preheating milk to a temperature in the range of about animal body temperature and 120° F., rapidly chilling said milk to a temperature below the freezing point of water, progressively sweating said chilled milk by subjecting the exposed surface of the chilled milk to vapor phase contact with live steam at such rate as to progressively attain the melting point of the milk fat, continuously removing the melted portion from the chilled portion, separating the resulting water and non-fat solids from the fat, heating the fat to a temperature in the range of about animal body temperature and 120° F. and clarifying the heated fat to obtain a highly refined, moisture-free pure fat.

UEL N. PETTY.

REFERENCES CITED

The following references are of record in the file of this patent:

UNITED STATES PATENTS

| Number | Name | Date |
| --- | --- | --- |
| 870,217 | Borgstrom | Nov. 5, 1907 |
| 913,920 | Schou | Mar. 2, 1909 |
| 1,965,618 | Vogt | July 10, 1934 |